United States Patent
Blum et al.

(10) Patent No.: US 8,729,210 B2
(45) Date of Patent: *May 20, 2014

(54) PREPOLYMERS BASED ON DI- OR POLYISOCYANATES AND FORMAMIDE-TERMINATED LOW MOLECULAR WEIGHT COMPOUNDS, PROCESSES FOR PREPARING THE SAME AND USES THEREOF

(75) Inventors: Harald Blum, Hafenlohr (DE); Evelyn Peiffer, Leverkusen (DE); Marc Leimenstoll, Hilden (DE)

(73) Assignee: Bayer MaterialScience AG, Leverkusen (DE)

( * ) Notice: Subject to any disclaimer, the term of this patent is extended or adjusted under 35 U.S.C. 154(b) by 433 days.

This patent is subject to a terminal disclaimer.

(21) Appl. No.: 12/837,536

(22) Filed: Jul. 16, 2010

(65) Prior Publication Data

US 2011/0015291 A1    Jan. 20, 2011

(30) Foreign Application Priority Data

Jul. 17, 2009 (DE) .......................... 10 2009 033 637

(51) Int. Cl.
*C08G 18/10* (2006.01)

(52) U.S. Cl.
USPC .................... 528/59; 528/44; 528/61; 528/68; 528/78; 560/25; 560/26; 560/115; 560/158; 564/44; 564/45

(58) Field of Classification Search
USPC .................. 560/25, 26, 115, 158; 564/44, 45; 528/44, 59, 61, 68, 78
See application file for complete search history.

(56) References Cited

U.S. PATENT DOCUMENTS

| | | | | |
|---|---|---|---|---|
| 4,282,330 A | * | 8/1981 | Austin | .......................... 521/118 |
| 4,841,095 A | * | 6/1989 | Bianchin et al. | .............. 560/115 |
| 2004/0162385 A1 | | 8/2004 | Krebs | |
| 2004/0259968 A1 | | 12/2004 | Krebs | |

FOREIGN PATENT DOCUMENTS

| | | |
|---|---|---|
| DE | 10229519 A1 | 1/2003 |
| DE | 10163857 A1 | 7/2003 |
| EP | 2098547 A2 | 9/2009 |
| WO | WO97/46603 | 12/1997 |

OTHER PUBLICATIONS

Kanamaru, M., et al., "A New Class of Polymer Having the -CO—NH—CO—NH—CO—Structure: Poly(*N,N'*-diacylurea)s Synthesized by Polyaddition of Diamides t Bis(N-acyl isocyanate)s", Macromolecules, No. 25, (1994), pp. 7492-7493.

* cited by examiner

*Primary Examiner* — John Cooney
(74) *Attorney, Agent, or Firm* — Novak Druce Connolly Bove + Quigg LLP

(57) ABSTRACT

Prepolymers, which are accessible from formamides of low molecular weight di- or triamines (formamide-terminated low molecular weight compounds) and di- or polyisocyanates, of the general formula (II):

$$X\text{—}[\text{—N(CHO)—CO—NH—}R^1\text{—NCO}]_n \qquad (II)$$

wherein X represents a linear or branched aliphatic, cycloaliphatic, heterocyclic and/or aromatic structural unit having 2 to 40 carbon atoms, and which is optionally further substituted and/or optionally comprises one or more heteroatoms, wherein $R^1$ represents an organic radical which may optionally contain one or more heteroatoms and which may further contain one or more additional free isocyanate groups and/or one or more urethane, biuret, carbodiimide, isocyanurate, allophanate, iminooxadiazinedione and/or uretdione structural units, and wherein $n \geq 2$; processes for making the same; compositions containing the same; and uses thereof.

9 Claims, No Drawings

PREPOLYMERS BASED ON DI- OR POLYISOCYANATES AND FORMAMIDE-TERMINATED LOW MOLECULAR WEIGHT COMPOUNDS, PROCESSES FOR PREPARING THE SAME AND USES THEREOF

BACKGROUND OF THE INVENTION

Isocyanate-functional polyurethanes or prepolymers of polyols and polyisocyanates are known and are the basis of many existing commercial products.

Reactive polyurethanes have reactive end groups which can react with water or other compounds which have an acid hydrogen atom. This form of reactivity makes it possible for the reactive polyurethanes to be brought in the desired manner to the desired location in the processed state (as a rule liquid to highly viscous) and to be cured by the addition of water or other compounds which have an acid hydrogen atom (in this case called curing agents).

In these so-called 2C systems, the curing agent is as a rule added directly before the application, in the normal case with the aid of a mixing and metering system, the processor having only a limited processing time (pot life) available after the addition of the curing agent.

However, it is likewise possible to cure polyurethanes with reactive end groups solely by the reaction with moisture in the atmosphere, without addition of curing agents (1C systems). Such 1C systems as a rule have the advantage over the 2C systems that for the user the often troublesome mixing of the frequently viscous component before application is omitted.

The polyurethanes with reactive end groups conventionally employed in 1C or 2C systems include, for example, the polyurethanes with preferably terminal isocyanate or NCO groups.

In order to obtain polyurethanes with terminal NCO groups, it is conventional to react polyfunctional alcohols with an excess of monomeric polyisocyanates, as a rule diisocyanates.

It is known that at the end of the reaction, regardless of the reaction time, a certain amount of the monomeric diisocyanate employed in excess is left over.

A content of monomeric diisocyanate has a troublesome effect, for example, during the processing of adhesives and sealants based on reactive polyurethanes. Even at room temperature, diisocyanates, such as IPDI or TDI, can have a vapour pressure which is not to be ignored. This noticeable vapour pressure has a serious effect in a spray application in particular, since significant amounts of isocyanate vapours, which have an irritant and sensitizing action, that is to say are toxic and consequently undesirable, may arise here via the application apparatus.

For many fields of use, the development of reactive polyurethanes or prepolymers with a drastically reduced content of monomeric diisocyanates is therefore highly desirable.

Reactive prepolymers or polyurethanes with a reduced residual monomer content can be prepared, for example, by the process disclosed in International Patent Publication No. WO1997046603, the entire contents of which are hereby incorporated herein by reference. In this, an excess of diisocyanate is reacted with polyols and the excess monomeric diisocyanate which remains after the reaction is removed by distillation. A disadvantage of this process is that products with high NCO contents typically have extremely high viscosities.

Alternatively, reactive prepolymers or polyurethanes with a reduced residual monomer content can be prepared in accordance with the teachings of, for example, DE-A 10 229 519 or DE-A 10 163 857, the entire contents of each of which are hereby incorporated herein by reference. In this case, diisocyanates with NCO groups of different reactivity are used and are reacted in a slight excess with polyol. A disadvantage of this procedure is that the resulting products typically have low NCO contents.

There is therefore still the desire to provide reactive prepolymers or polyurethanes which have low viscosities, high NCO contents and low residual monomer contents.

Higher molecular weight polyether-amines can be reacted with formic acid alkyl esters to give the corresponding formamide-terminated oligomers, which can be reacted further with polyisocyanates to give the corresponding prepolymers, that is to say to give acylurea prepolymers. These have a generally low viscosity.

BRIEF SUMMARY OF THE INVENTION

The invention relates, in general, to novel prepolymers or polyisocyanates prepared from formamides based on difunctional or more than difunctional aliphatic, cycloaliphatic or aromatic amines of defined molecular weight, that is to say formamide-terminated low molecular weight compounds.

It has now been surprisingly found that by reaction of formamide-terminated low molecular weight compounds with polyisocyanates, acylurea prepolymers or higher molecular weight polyisocyanates which are distinguished by a low viscosity, without having the polyether structural units which are troublesome for quite a lot of uses, are accessible.

The invention therefore provides prepolymers, prepared from di- or polyisocyanates and formamide-terminated low molecular weight compounds, of the general formula (II)

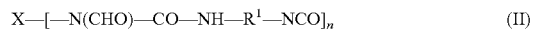

Formamide-terminated low molecular weight compounds are accessible, for example, by reaction of formic acid $C_1$-$C_4$-alkyl esters with suitable defined amines.

One embodiment of the present invention includes prepolymer of the general formula (II):

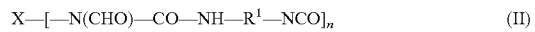

wherein X represents a linear or branched aliphatic, cycloaliphatic, heterocyclic and/or aromatic structural unit having 2 to 40 carbon atoms, and which is optionally further substituted and/or optionally comprises one or more heteroatoms; wherein $R^1$ represents an organic radical which may optionally contain one or more heteroatoms and which may further contain one or more additional free isocyanate groups and/or one or more urethane, biuret, carbodiimide, isocyanurate, allophanate, iminooxadiazinedione and/or uretdione structural units; and wherein n≥2.

Another embodiment of the present invention includes processes for preparing a prepolymer of the general formula (II):

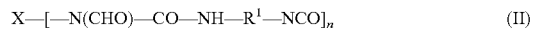

the processes comprising providing a di- or polyisocyanate, providing a formamide-terminated low molecular weight compound, and reacting the di- or polyisocyanate with the formamide-terminated low molecular weight compound; wherein X represents a linear or branched aliphatic, cycloaliphatic, heterocyclic and/or aromatic structural unit having 2 to 40 carbon atoms, and which is optionally further substituted and/or optionally comprises one or more heteroatoms; wherein $R^1$ represents an organic radical which may optionally contain one or more heteroatoms and which may further contain one or more additional free isocyanate groups and/or one or more urethane, biuret, carbodiimide, isocyanurate, allophanate, iminooxadiazinedione and/or uretdione structural units; and wherein n≥2.

Another embodiment of the present invention includes compositions which comprise a prepolymer in accordance with the present invention and which are preferably adhesives, lacquers, and/or sealants. Another embodiment of the present invention includes PU shaped or foamed articles comprising a prepolymer in accordance with the present invention.

Yet another embodiment of the present invention includes methods for preparing a composition selected from the group consisting of adhesives, lacquers, and sealants, the method comprising providing a prepolymer in accordance with the present invention, and reacting or blending the prepolymer with one or more additional components selected from conventional adhesive, lacquer, and sealant reactants, auxiliaries and additives.

DETAILED DESCRIPTION OF THE INVENTION

As used herein, the singular terms "a" and "the" are synonymous and used interchangeably with "one or more" and "at least one," unless the language and/or context clearly indicates otherwise. Accordingly, for example, reference to "a prepolymer" herein or in the appended claims can refer to a single prepolymer or more than one prepolymer. Additionally, all numerical values, unless otherwise specifically noted, are understood to be modified by the word "about."

Suitable amines $X(NH_2)_n$, where n≥2, are, for example, di- and/or triamines with aliphatic, cycloaliphatic, heterocyclic and/or aromatic structural units which have 2 to 40, preferably 2 to 20 C atoms and are linear and/or branched and/or carry substituents and/or contain hetero atoms, for example oxygen atoms. They have a molecular weight of from 45 to 700, preferably 60 to 300 g/mol.

Di- or triamines which can be employed are, preferably, aliphatic amines, e.g. ethylenediamine, 1,2-propylenediamine, 1,3-propylenediamine, 1,4-butanediamine, neopentanediamine, 1,5-diamino-2-methylpentane (Dytek® A, DuPont), 2-butyl-2-ethyl-1,5-pentanediamine, 1,6-hexamethylenediamine, 2,5-diamino-2,5-dimethylhexane, 2,2,4- and/or 2,4,4-trimethyl-1,6-diaminohexane, 1,8-diaminooctane, 1,11-diaminoundecane, 1,12-diaminododecane, 4-aminomethyl-1,8-octanediamine (triaminononane), diethylenetriamine, triethylenetetramine, cycloaliphatic amines, such as e.g. 1-amino-3,3,5-trimethyl-5-aminomethyl-cyclohexane (isophoronediamine, IPDA), TCD-diamine, 1,4-cyclohexanediamine, 2,4- and/or 2,6-hexahydrotoluylenediamine ($H_6$TDA), isopropyl-2,4-diaminocyclohexane and/or isopropyl-2,6-diaminocyclohexane, tricyclodecanebis(methylamine), 1,3-bis-(aminomethyl)-cyclohexane, 2,4'- and/or 4,4'-diaminodicyclohexylmethane (PACM 20), 3,3'-dimethyl-4,4'-diaminodicyclohexylmethane (Laromin® C 260, BASF AG, DE), the isomeric diaminodicyclohexylmethanes containing a methyl group as a substituent on the nucleus (=C-monomethyldiaminodicyclohexylmethanes), 3(4)-aminomethyl-1-methylcyclohexylamine (AMCA), and araliphatic di- or triamines, such as e.g. 1,3-diaminobenzene, 1,4-diaminobenzene, 2,4- and/or 2,6-diaminotoluene (TDA), 1,3-bis-(aminomethyl)-benzene, 3,5-diethyltoluene-2,4-diamine, m-xylylenediamine, 4,6-dimethyl-1,3-benzenedimethanamine, 4,4'- and/or 2,4'- and/or 2,2'-methylenebisbenzenamine (MDA), dimer fatty acid diamine, bis-(3-aminopropyl)-methylamine, 4,9-dioxadodecane-1,12-diamine, 4,7,10-trioxatridecane-1,13-diamine and diamines containing alkoxysilane groups. Michael adducts, which are obtained e.g. by reaction of bifunctional primary amines with compounds containing unsaturated groups, such as e.g. hexanediol diacrylate etc., are likewise suitable.

The preparation of formamide-terminated low molecular weight compounds can be carried out in a variety of ways.

The reaction of the di- and/or triamine can be carried out in an excess of formic acid alkyl ester at the boiling temperature thereof, the excess of formic acid alkyl ester and the alcohol also formed being distilled off after the reaction of the amino group to give the formamide group has taken place.

Reaction of the di- or triamines to give the formamide-terminated low molecular weight compounds with formic acid or other formic acid derivatives, such as carbon monoxide, mixed formic acid-carboxylic acid anhydrides, low molecular weight amides or active esters of formic acid or precursor reaction products of formic acid with amide coupling reagents, such as carbodiimides or condensed phospho acid derivatives, is furthermore possible.

Reaction of formamide, or the anion of formamide generated with a strong base, with alkylating reagents of the formula (I)

$$X\text{-}[A]_p \qquad (I)$$

wherein X represents an aliphatic, cycloaliphatic or aromatic radical, p represents a natural number from 2 to 3 and A represents a leaving group, such as, for example, chloride, bromide, iodide, mesylate, tosylate or triflate, is likewise possible.

The prepolymers according to the invention are reaction products of di- or polyfunctional polyisocyanates and formamides based on aliphatic, cycloaliphatic and/or aromatic defined diamines or triamines having 2 to 15 C atoms and optionally containing hetero atoms, and with a molecular weight of from 60 to 300.

The prepolymers or polyisocyanates according to the invention are preferably prepolymers of the general formula (II)

$$X\text{—}[\text{—}N(CHO)\text{—}CO\text{—}NH\text{—}R^1\text{—}NCO]_n \qquad (II)$$

wherein X, corresponding to the di- or polyamines used, represents an aliphatic, cycloaliphatic or aromatic radical, $R^1$ represents the radical introduced by the polyisocyanate employed and n represents a natural number from 2 to 5.

The invention also provides a process for the preparation of the prepolymers according to the invention, characterized in that di- or polyisocyanates are reacted with a formamide-terminated low molecular weight compound and the excess of di- or polyisocyanate which may be present is separated off by distillation.

The reaction of the formamide-terminated low molecular weight compounds with the di- or polyisocyanates is carried out at temperatures of from 40 to 120° C., preferably at 60 to 80° C., in the presence or, preferably, in the absence of catalysts, such as compounds of zinc or of tin. In this context, the di- or polyisocyanate is preferably employed such that a 2- to 15-fold molar excess of isocyanate groups, based on the isocyanate-reactive groups of the formamide-terminated low molecular weight compound, is present, and the excess is removed by distillation, preferably thin film distillation, in vacuo after the reaction to give the acylurea prepolymers.

Suitable polyisocyanate components can be polyisocyanates which have at least two free isocyanate groups per molecule. Suitable polyisocyanates are e.g. di- or polyisocyanates $$X\text{—}(NCO)_m,$$

wherein m=2 to 10 and X represents an aliphatic hydrocarbon radical having 4 to 36 carbon atoms, a cycloaliphatic hydrocarbon radical having 6 to 15 carbon atoms, an aromatic hydrocarbon radical having 6 to 15 carbon atoms or an araliphatic hydrocarbon radical having 7 to 15 carbon atoms.

Examples of such difunctional or more than difunctional polyisocyanates are 1,4-, 1,3- and/or 1,2-cyclohexane-diisocyanate, 1-methyl-2,4-diisocyanato-cyclohexane, 1-methyl-2,6-diisocyanato-cyclohexane, tetramethylene-diisocyanate, octamethylene-diisocyanate, decamethylene-diisocyanate, dodecamethylene-diisocyanate, $H_6$-2,4- and/or 2,6-diisocyanatotoluene, 4,4'-diisocyanatodiphenylmethane, 2,4'-diisocyanatodiphenylmethane, 2,2'-diisocyanatodiphenylmethane, meta- and/or para-xylylene-diisocyanate, 2,4-diisocyanatotoluene and/or 2,6-diisocyanatotoluene, isopropenyldimethyltoluylene-diisocyanate, α,α,α',α'-tetramethyl-m- and/or -p-xylylene-diisocyanate, 1,6-hexamethylene-diisocyanate, trimethylhexane-diisocyanate, tetramethylhexane-diisocyanate, nonane-triisocyanate, 1-isocyanato-3,3,5-trimethyl-5-isocyanatomethylcyclohexane (isophorone-diisocyanate), 4,4'-diisocyanato-dicyclohexylmethane and/or 2,4'-diisocyanato-dicyclohexylmethane and/or 2,2'-diisocyanato-dicyclohexylmethane and mono- and dimethyl-substituted derivatives thereof.

Reaction products, homologues, oligomers and/or polymers of the polyisocyanates mentioned with urethane, biuret, carbodiimide, isocyanurate, allophanate, iminooxadiazinedione and/or uretdione structural units, and mixtures of the isocyanates mentioned by way of example, optionally also with others, are likewise suitable.

The average functionality of the polyisocyanate component is 1.0 to 4, preferably 1.8 to 3, particularly preferably 2.0 to 2.5.

The polyisocyanate component B) preferably comprises liquid oligomeric polyisocyanates based on hexamethylene-diisocyanate, isophorone-diisocyanate, $H_6$-2,4- and/or 2,6-diisocyanatotoluene, 4,4'-diisocyanatodiphenylmethane, 2,4'-diisocyanatodiphenylmethane, 2,2'-diisocyanatodiphenylmethane, meta- and/or para-xylene-diisocyanate, 2,4-diisocyanatotoluene and/or 2,6-diisocyanatotoluene with urethane, urea, isocyanurate, biuret, uretdione, carbodiimide, allophanate and/or iminooxadiazinedione structural units or/and reaction products or prepolymers, containing urethane and/or allophanate groups, of the diisocyanates mentioned as preferred with hydroxy-functional compounds, such as e.g. trimethylolpropane, butanediol, ethylene glycol, diethylene glycol, propylene glycol, neopentyl glycol, C2-, C3 and/or C4-polyethers, polyesters, polycarbonates and castor oil.

The polyisocyanate component B) particularly preferably comprises hexamethylene-diisocyanate, isophorone-diisocyanate, 2,4-diisocyanatotoluene and/or 2,6-diisocyanatotoluene, 4,4'-diisocyanatodiphenylmethane, 2,4'-diisocyanatodiphenylmethane, 2,2'-diisocyanatodiphenylmethane or isomer mixtures.

The prepolymers according to the invention can be used in all fields where the prepolymers corresponding to the prior art are also employed, such as adhesives, lacquers, PU shaped or foamed articles or sealants. In this context, they have the advantage in particular of a relatively low viscosity.

Low viscosities are particularly advantageous e.g. in the uses of "flexible packaging" or "reactive polyurethane hot-melt adhesives" (hotmelts). "Flexible packaging" is understood here as meaning the production of composite films by gluing with an adhesive based on polyurethane. In this case, the adhesive is typically applied in liquid form to a film and directly thereafter joined with a second film. Reactive polyurethane hot-melt adhesives are understood as meaning adhesive systems which are in the form of a melt at elevated temperatures and are applied in liquid form at these temperatures. After application and joining, the still reactive adhesive cools and thereby rapidly builds up an initial strength. The final strength is achieved after complete curing with moisture from the atmosphere.

The use of formamide-based prepolymers/polyisocyanates is also possible in combination with polyisocyanates and/or prepolymers with urethane, biuret, carbodiimide, isocyanurate, allophanate, iminooxadiazinedione, uretdione, ester, polyester, ether, polyether, carbonate or polycarbonate structural units.

The invention will now be described in further detail with reference to the following non-limiting examples.

EXAMPLES

Starting substances used:
Desmodur® H (Bayer MaterialScience AG, Leverkusen, DE), monomeric HDI,
1,6-hexanediol,
1,10-decanediol,
1,6-hexamethylenediamine,
2-methyl-1,5-diaminopentane,
Irganox® 1076 (Ciba, CH), a sterically hindered phenol.

Example 1

222 g of formic acid ethyl ester are added dropwise at a maximum of 50° C. to 116 g of 1,6-hexamethylenediamine, dissolved in 170 g of ethanol, in the course of 4 hours and the mixture is subsequently stirred for 4 hours. The excess formic acid ethyl ester and the ethanol formed and employed are then distilled off. The formamide-terminated defined compound formed is metered into 2,523 g of Desmodur® H, 1 g of Irganox® 1076 and 2 g of benzoyl chloride at 70° C. in the course of 2 hours and the mixture is subsequently stirred at 70° C. for 8 h. The excess Desmodur® H is then separated off in a thin film distillation at 130° C.

An acylurea prepolymer having an NCO content of 15.7 wt. % and viscosities as shown in Table 1 is obtained. The residual monomer content here is 0.46 wt. %.

Example 2

222 g of formic acid ethyl ester are added dropwise at a maximum of 50° C. to 116 g of 2-methyl-1,5-diaminopentane in the course of 4 hours and the mixture is subsequently stirred for 4 hours. The excess formic acid ethyl ester and the ethanol formed are then distilled off. The formamide-terminated defined compound formed is metered into 2,523 g of Desmodur® H, 1 g of Irganox® 1076 and 2 g of benzoyl chloride at 70° C. in the course of 2 hours and the mixture is subsequently stirred at 70° C. for 8 h. The excess Desmodur® H is then separated off in a thin film distillation at 130° C.

An acylurea prepolymer having an NCO content of 15.7 wt. % and viscosities as shown in Table 1 is obtained. The residual monomer content here is 0.07 wt. %.

Example 3

222 g of formic acid ethyl ester are added dropwise at a maximum of 50° C. to 220 g of 4,7,10-trioxatridecane-1,13-diamine in the course of 4 hours and the mixture is subsequently stirred for 4 hours. The excess formic acid ethyl ester and the ethanol formed are then distilled off. The formamide-terminated defined compound formed is metered into 3,334 g of Desmodur® I, 1 g of Irganox® 1076 and 1 g of benzoyl chloride at 60° C. in the course of 2 hours and the mixture is subsequently stirred at 60° C. for 8 h. The excess Desmodur® I is then separated off in a thin film distillation at 160° C.

An acylurea prepolymer having an NCO content of 9.3 wt. % and viscosities as shown in Table 1 is obtained. The residual monomer content here is 0.29 wt. %.

Example 4

222 g of formic acid ethyl ester are added dropwise at a maximum of 50° C. to 116 g of 2-methyl-1,5-diaminopentane in the course of 4 hours and the mixture is subsequently stirred for 4 hours. The excess formic acid ethyl ester and the ethanol formed are then distilled off. The formamide-terminated defined compound formed is metered into 2,612 g of Desmodur® T, 1 g of Irganox® 1076 and 1 g of benzoyl chloride at 70° C. in the course of 2 hours and the mixture is subsequently stirred at 70° C. for 8 h. The excess Desmodur® T is then separated off in a thin film distillation at 130° C.

An acylurea prepolymer having an NCO content of 16.1 wt. % and viscosities as shown in Table 1 is obtained. The residual monomer content here is 0.81 wt. %.

Example 5

222 g of formic acid ethyl ester are added dropwise at a maximum of 50° C. to 116 g of 2-methyl-1,5-diaminopentane in the course of 4 hours and the mixture is subsequently stirred for 4 hours. The excess formic acid ethyl ester and the ethanol formed are then distilled off. The formamide-terminated defined compound formed is metered into a mixture of 1,262 g of Desmodur® H, 1,667 g of Desmodur® I, 1.5 g of Irganox® 1076 and 1.5 g of benzoyl chloride at 70° C. in the course of 2 hours and the mixture is subsequently stirred at 70° C. for 8 h. The excess Desmodur® H and Desmodur® I is then separated off in a thin film distillation at 140-170° C.

An acylurea prepolymer having an NCO content of 13.1 wt. % and a viscosity of 6,940,000 mPa·s at 25° C. is obtained. The residual monomer content here is 0.16 wt. % for HDI and 0.60 wt. % for IPDI.

Example 6

A mixture of two formamide-terminated defined compounds synthesized separately from one another beforehand (86 g of 2-methylpentane-1,5-pentanediformamide+86 g of hexamethylenediformamide) is metered into 2,523 g of Desmodur® H, 1.5 g of Irganox® 1076 and 1.5 g of benzoyl chloride at 70° C. in the course of 2 hours and the mixture is subsequently stirred at 70° C. for 8 hours. The excess Desmodur® H is then separated off in a thin film distillation at 130° C.

An acylurea prepolymer having an NCO content of 15.9 wt. % and a viscosity of 6,600 mPa·s at 25° C. is obtained. The residual monomer content here is only 0.05 wt. %.

Comparison Example 1

8 g of 1,6-hexanediol are added dropwise to 192 g of Desmodur® H at 90° C. in the course of 1 hour and the mixture is subsequently stirred for 8 hours. The excess Desmodur® H is then separated off by thin film distillation at 130° C.

A polyurethane prepolymer having an NCO content of 15.0 wt. % and viscosities as shown in Table 1 is obtained. The residual monomer content here is 3.8 wt. %.

Comparison Example 2

12 g of 1.10-decanediol are added dropwise to 188 g of Desmodur® H at 90° C. in the course of 1 hour and the mixture is subsequently stirred for 8 hours. The excess Desmodur® H is then separated off by thin film distillation at 130° C.

A polyurethane prepolymer having an NCO content of 13.7 wt. % and viscosities as shown in Table 1 is obtained. The residual monomer content here is 3.6 wt. %.

TABLE 1

| Viscosities of Examples 1-4 and Comparison Examples at various temperatures | | | | | | |
|---|---|---|---|---|---|---|
| Viscosity in mPa * s | | | | | | |
| at ° C. | Ex. 1 | Ex. 2 | Ex. 3 | Ex. 4 | Comparison 1 | Comparison 2 |
| 25 | 5,145 | 9,290 | solid | solid | solid | solid |
| 50 | 513 | 693 | 9,397 | solid | solid | solid |
| 75 | 121 | 142 | 874 | 28,750 | solid | solid |
| 100 | 45 | 52 | 135 | 2,339 | 220 | 69 |

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A prepolymer of the general formula (II):

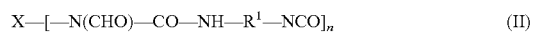

$$X\text{—}[\text{—}N(CHO)\text{—}CO\text{—}NH\text{—}R^1\text{—}NCO]_n \qquad (II)$$

wherein X represents a linear or branched aliphatic, cycloaliphatic, heterocyclic and/or aromatic structural unit having 2 to 20 carbon atoms, which is free of polyether structural units and which is optionally further substituted and/or optionally comprises one or more heteroatoms; wherein $R^1$ represents an organic radical which may optionally contain one or more heteroatoms and which may further contain one or more additional free isocyanate groups and/or one or more urethane, biuret, carbodiimide, isocyanurate, allophanate, iminooxadiazinedione and/or uretdione structural units; and wherein n≥2.

2. The prepolymer according to claim 1, wherein $R^1$ represents an aliphatic hydrocarbon radical having 4 to 36 carbon atoms, a cycloaliphatic hydrocarbon radical having 6 to 15 carbon atoms, an aromatic hydrocarbon radical having 6 to 15 carbon atoms or an araliphatic hydrocarbon radical having 7 to 15 carbon atoms which may optionally contain one or more heteroatoms and which may further contain one or more additional free isocyanate groups and/or one or more urethane, biuret, carbodiimide, isocyanurate, allophanate, iminooxadiazinedione and/or uretdione structural units.

3. The prepolymer according to claim 1, wherein X represents a structural unit derived from a polyamine $X(NH_2)_n$, wherein n≥2, selected from the group consisting of ethylenediamine, 1,2-propylenediamine, 1,3-propylenediamine, 1,4-butanediamine, neopentanediamine, 1,5-diamino-2-methylpentane, 2-butyl-2-ethyl-1,5-pentanediamine, 1,6-hexamethylenediamine, 2,5-diamino-2,5-dimethylhexane, 2,2,4- and/or 2,4,4-trimethyl-1,6-diaminohexane, 1,8-diaminooctane, 1,11-diaminoundecane, 1,12-diaminododecane, 4-aminomethyl-1,8-octanediamine (triaminononane), diethylenetriamine, triethylenetetramine, 1-amino-3,3,5-trimethyl-5-aminomethyl-cyclohexane, TCD-diamine, 1,4-cyclohexanediamine, 2,4- and/or 2,6-hexahydrotoluoylenediamine, isopropyl-2,4-diaminocyclohexane and/or isopropyl-2,6- diaminocyclohexane, tricyclodecanebis(methylamine), 1,3-bis-(aminomethyl)-cyclohexane, 2,4'- and/or 4,4'-diaminodicyclohexylmethane, 3,3'-dimethyl-4,4'-diaminodicyclohexylmethane, isomeric diaminodicyclohexylmethanes containing a methyl group as a substituent on the nucleus, 3(4)-aminomethyl-1-methylcyclohexyl-amine, 1,3-diaminobenzene, 1,4-diaminobenzene, 2,4- and 2,6-diaminotoluene, 1,3-bis-(aminomethyl)-benzene, 3,5-diethyltoluene-2,4-diamine, m-xylylenediamine, 4,6-dimethyl-1,3-benzenedimethanamine, 4,4'- and/or 2,4'- and/or 2,2'-methylenebisbenzenamine, dimer fatty acid diamines, bis-(3-aminopropyl)-methylamine, 4,9-dioxadodecane-1,12-diamine, 4,7,10-trioxamidecane-1,13-diamine, diamines containing alkoxysilane groups and Michael adducts prepared by reaction of bifunctional primary amines with compounds containing unsaturated groups.

4. A process for preparing a prepolymer of the general formula (II):

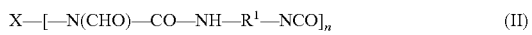   (II)

the process comprising providing a di- or polyisocyanate, providing a formamide-terminated low molecular weight compound, and reacting the di- or polyisocyanate with the formamide-terminated low molecular weight compound; wherein X represents a linear or branched aliphatic, cycloaliphatic, heterocyclic and/or aromatic structural unit having 2 to 20 carbon atoms, which is free of polyether structural units and which is optionally further substituted and/or optionally comprises one or more heteroatoms; wherein $R^1$ represents an organic radical which may optionally contain one or more heteroatoms and which may further contain one or more additional free isocyanate groups and/or one or more urethane, biuret, carbodiimide, isocyanurate, allophanate, iminooxadiazinedione and/or uretdione structural units; and wherein $n \geq 2$.

5. The process according to claim 4, wherein the process further comprises separating excess di- or polyisocyanate from the prepolymer.

6. The process according to claim 4, wherein the formamide-terminated low molecular weight compound has the general formula (III):

   (III)

wherein X and n are as defined, and wherein one mole of the formamide-terminated low molecular weight compound is reacted with n to 10(n) moles of the di- or polyisocyanate.

7. The process according to claim 6, wherein the process further comprises separating excess di- or polyisocyanate from the prepolymer.

8. A composition comprising a prepolymer according to claim 1 and one or more additional components selected from adhesive, lacquer, and sealant reactants, auxiliaries and additives.

9. A method for preparing a composition selected from the group consisting of adhesives, lacquers, and sealants, the method comprising providing a prepolymer according to claim 1, and reacting or blending the prepolymer with one or more additional components selected from adhesive, lacquer, and sealant reactants, auxiliaries and additives.

* * * * *